(12) United States Patent  (10) Patent No.: US 9,355,266 B2
Cronholm  (45) Date of Patent: May 31, 2016

(54) INPUT BY TRACKING GESTURES

(71) Applicant: CRUNCHFISH AB, Malmö (SE)

(72) Inventor: Paul Cronholm, Malmö (SE)

(73) Assignee: CRUNCHFISH AB, Malmo (SE)

(*) Notice: Subject to any disclaimer, the term of this patent is extended or adjusted under 35 U.S.C. 154(b) by 0 days.

(21) Appl. No.: 14/419,089

(22) PCT Filed: Jul. 26, 2013

(86) PCT No.: PCT/SE2013/050935
§ 371 (c)(1),
(2) Date: Feb. 2, 2015

(87) PCT Pub. No.: WO2014/021769
PCT Pub. Date: Feb. 6, 2014

(65) Prior Publication Data
US 2015/0220749 A1  Aug. 6, 2015

Related U.S. Application Data

(60) Provisional application No. 61/680,092, filed on Aug. 6, 2012.

(30) Foreign Application Priority Data

Aug. 3, 2012  (SE) ..................................... 1250912

(51) Int. Cl.
| H04L 29/06 | (2006.01) |
| G06F 21/00 | (2013.01) |
| G06F 21/62 | (2013.01) |
| G06F 1/16  | (2006.01) |
| G06F 3/01  | (2006.01) |

(Continued)

(52) U.S. Cl.
CPC .............. *G06F 21/62* (2013.01); *G06F 1/1686* (2013.01); *G06F 1/325* (2013.01); *G06F 1/3215* (2013.01); *G06F 1/3231* (2013.01); *G06F 3/017* (2013.01); *G06K 9/00355* (2013.01); *G06F 2200/1637* (2013.01)

(58) Field of Classification Search
CPC ....... G06F 21/62; G06F 3/017; G06F 1/1686; G06K 9/00355
See application file for complete search history.

(56) References Cited

U.S. PATENT DOCUMENTS

| 2007/0150842 A1* | 6/2007 | Chaudhri ............ G06F 3/04883 715/863 |
| 2009/0143877 A1* | 6/2009 | Panje .................... G06F 1/1626 700/83 |
| 2010/0042954 A1* | 2/2010 | Rosenblatt ............ G06F 1/1626 715/863 |

(Continued)

FOREIGN PATENT DOCUMENTS

EP  1736908 A2  12/2006

*Primary Examiner* — Lisa Lewis (74) *Attorney, Agent, or Firm* — Birch, Stewart, Kolasch & Birch, LLP (57) ABSTRACT

A computing device arranged for tracking an object in an image stream provided by a camera, said computing device comprising a memory and a controller, wherein said controller is configured to: track at least one object, identify a gesture, wherein said gesture is defined by said tracked at least one object in free space in front of said camera, retrieve an associated command, and execute said associated command, wherein said associated command is a command for controlling access to the computation device.

14 Claims, 6 Drawing Sheets

(51) Int. Cl.
 *G06K 9/00* (2006.01)
 *G06F 1/32* (2006.01)

(56) References Cited

U.S. PATENT DOCUMENTS

| | | |
|---|---|---|
| 2011/0074675 A1 | 3/2011 | Shiming et al. |
| 2011/0134251 A1* | 6/2011 | Kim ...................... H04N 5/232 348/164 |
| 2011/0310005 A1 | 12/2011 | Chen et al. |
| 2012/0086863 A1 | 4/2012 | Williams et al. |
| 2012/0094757 A1* | 4/2012 | Vago ....................... A63F 13/12 463/31 |
| 2012/0174214 A1* | 7/2012 | Huang .................... G06F 21/32 726/19 |
| 2013/0004016 A1* | 1/2013 | Karakotsios ....... G06K 9/00355 382/103 |

* cited by examiner

INPUT BY TRACKING GESTURES

CROSS REFERENCE TO RELATED APPLICATIONS

This application is the National Phase of PCT International Application No. PCT/SE2013/050935, filed on Jul. 26, 2013, which claims priority under 35 U.S.C. 119(e) to U.S. Provisional Application No. 61/680,092, filed on Aug. 6, 2012 and under 35 U.S.C. 119(a) to Patent Application No. 1250912-1, filed in Sweden on Aug. 3, 2012, all of which are hereby expressly incorporated by reference into the present application.

TECHNICAL FIELD

This application relates to a method, a computer-readable medium and a computing device for providing an improved input manner, and in particular to a method, a computer-readable medium and a computing device for providing an improved manner of inputting a device lock or device unlock command.

BACKGROUND

Contemporary computing devices are more and more arranged with a touch interface implemented through a touch display. It is quickly becoming the norm for smartphones and internet tablets but also laptop computers and kiosk computers and also general computers are being arranged with touch displays.

Touch displays are complex in their structure and often very costly. In fact, the touch display is often the singularly most expensive component in a modern smartphone. The complexity of their structure renders them quite fragile unfortunately and they are therefore sensitive to wear and tear and also to shock and other forms of physical influence.

The touch displays also bring an inherent flaw, especially when it comes to security. As most touch displays are manipulated with direct contact with a user's finger(s) they are repeatedly subjected to, among other influences, fat. This fat accumulates on the surface of the touch display. This enables dust and other particles to adhere to the touch display potentially increasing the wear of the display, causing it to be scratched.

The fat also leaves a trace that is clearly visible, both when dust and other particles have adhered to the fat trace and the fat trace on its own. The fat trace makes it possible to identify commonly executed commands on a touch display. This makes it possible for fraudulent users to extract or manipulate information from the device without the permission of the rightful owner.

There is thus a need for a manner of inputting information to a computing device without increasing the wear and tear of the device. There is also a need for a manner of executing security commands in a manner that is not traceable.

SUMMARY

It is an object of the teachings of this application to overcome the problems listed above by providing a computing device arranged for tracking an object in an image stream provided by a camera, said computing device comprising a memory and a controller, wherein said controller is configured to: track at least one object, identify a gesture, wherein said gesture is defined by said tracked at least one object moving in free space in front of said camera, retrieve an associated command, and execute said associated command, wherein said associated command is a command for controlling access to the computation device.

Such a computing device does not require the proximity of a user as in the prior art. Further it does not require the user to execute the same spatial precision a in the prior art. Nor do such computation devices enable fraudulent users to easily retrieve sensitive information by a visual inspection of the computation device.

The manner disclosed herein is suite for implementation in almost any contemporary computation device, as such computation devices have been equipped with cameras since 2002, when Nokia® launched the very first mobile phone with a built in camera, the Nokia 7650®, and since the launch of the Sony Ericsson T610® in 2003 the inclusion of a camera in a mobile phone has become widespread. A manner as taught herein can thus beneficially be implemented easily in almost any existing computation device.

In one embodiment the gesture represents an unlocking gesture and said command is an unlocking command allowing access to the computation device.

In one embodiment the controller is further configured to activate said camera upon detecting a startup trigger. This allows for reduced power consumption. In one embodiment the trigger is a tilting of the computation device and this allows for activating the camera as the computation device is picked up by a user.

In one embodiment the controller is further configured to display a visual indication according to movements tracked for said at least one object to be tracked. This allows for an intuitive manner of reminding and guiding a user of how to input a (complex) gesture.

It is also an object of the teachings of this application to overcome the problems listed above by providing a method for use in a computing device arranged for tracking an object in an image stream provided by a camera, said method comprising: tracking at least one object, identifying a gesture, wherein said gesture is defined by said tracked at least one object moving in free space in front of said camera, retrieving an associated command, and executing said associated command, wherein said associated command is a command for controlling access to the computation device.

It is a further object of the teachings of this application to overcome the problems listed above by providing a computer readable medium comprising instructions that when loaded into and executed by a controller, such as a processor, cause the execution of a method according to herein.

The inventors of the present invention have realized, after inventive and insightful reasoning, that through cleverly assigning a gesture to an unlocking command, a simple and secure manner of activating a computation device without leaving a trace and that does not require a touch display and furthermore reduces the wear and tear of a touch display, and protects the computation device against fraudulent use is provided.

The teachings herein find use in control systems for computational devices having user interfaces such as smart phones, internet tablets, computers and gaming consoles.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
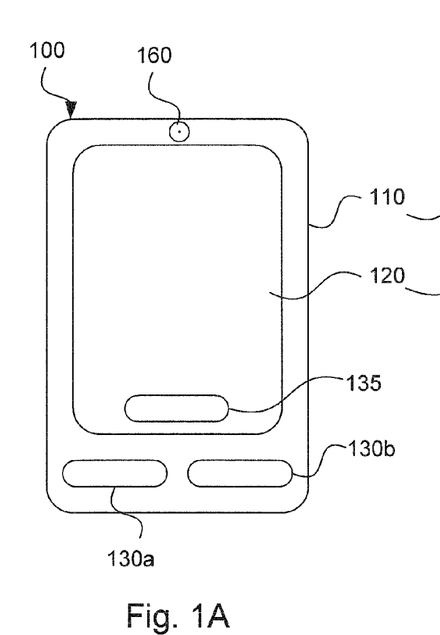
FIGS. 1A and 1B are schematic views of each a computing device according to the teachings herein.
Figure 1B:
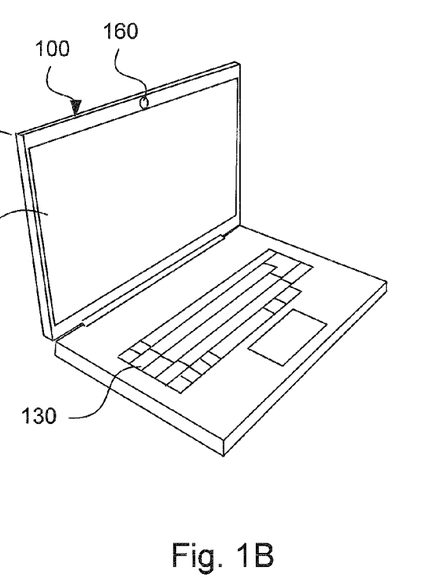

FIG. 1 generally shows a computing device 100 according to an embodiment herein. In one embodiment the computing device 100 is configured for network communication, either wireless or wired. Examples of such a computing device 100 are: a personal computer, desktop or laptop, an internet tablet, a mobile communications terminal such as a mobile telephone, a smart phone, a personal digital assistant and a game console. Two embodiments will be exemplified and described as being a smartphone in FIG. 1A and a laptop computer 100 in FIG. 1B.

Referring to FIG. 1A a mobile communications terminal in the form of a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100. The smartphone 100 is also equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream.

Referring to FIG. 1B a laptop computer 100 comprises a display 120, which in one embodiment is a touch display, and a housing 110. The housing comprises a controller or CPU (not shown) and one or more computer-readable storage mediums (not shown), such as storage units and internal memory. Examples of storage units are disk drives or hard drives. The computing device 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a computing device 100 to connect with other computing devices or a server.

The laptop computer 100 further comprises at least one input unit such as a keyboard 130. Other examples of input units are computer mouse, touch pads or joysticks to name a few.

The laptop computer 100 is further equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream.

Figure 2:
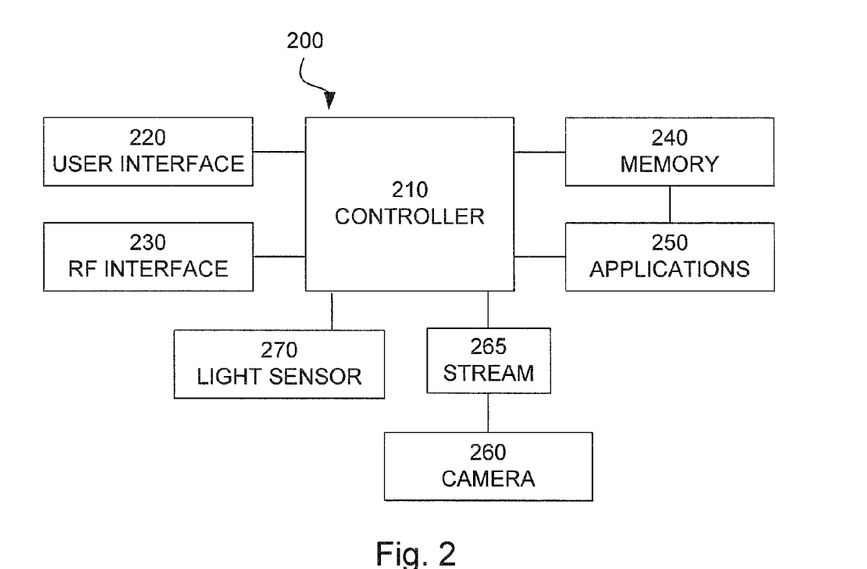
FIG. 2 is a schematic view of the components of a computing device according to the teachings herein.

FIG. 2 shows a schematic view of the general structure of a computing device according to FIG. 1. The computing device 100 comprises a controller 210 which is responsible for the overall operation of the computing device 200 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the computing device 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the computing device 200. The software modules include a real-time operating system, drivers for a user interface 220, an application handler as well as various applications 250. The applications are sets of instructions that when executed by the controller 210 control the operation of the computing device 200. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, voice call applications, Short Message Service applications, location finding applications.

The computing device 200 further comprises a user interface 220, which in the computing device of FIGS. 1A and 1B is comprised of the display 120 and the keys 130, 135.

The computing device 200 further comprises a radio frequency interface 230, which is adapted to allow the computing device to communicate with other devices through a radio frequency band through the use of different radio frequency technologies. Examples of such technologies are IEEE 802.11, IEEE 802.11s, and Bluetooth®. Other examples of radio technologies that may be implemented in a computing device 100 are W-CDMA, GSM, UTRAN, LTE, and NMT to name a few.

The computing device 200 is further equipped with a camera 260. The camera 260 is a digital camera that is arranged to take video or still photographs by recording images on an electronic image sensor (not shown).

The camera 260 is operably connected to the controller 210 to provide the controller with the video stream 265, i.e. the series of images captured, for further processing possibly for use in and/or according to one or several of the applications 250.

In one embodiment the camera 260 is an external camera or source of an image stream.

The controller 210 is configured to track an object, such as a hand, in the video or image stream 265 and to identify gestures performed by the tracked object. Details on how the tracking of an object may be implemented and also details on how a gesture may be identified are disclosed in the two Swedish patent applications SE1250910-5 entitled IMPROVED VIDEO TRACKING and SE1250911-3 entitled IMPROVED IDENTIFICATION OF A GESTURE, respectively, and will not be disclosed more in this application. For details on operation, constraints, functionality and implementation reference is given to the two Swedish patent applications as identified above.

It should be noted specifically that the Swedish patent applications referred to above provide ample teaching on how an object may be tracked in three spatial dimensions thereby allowing the computation device 100, 200 to identify three dimensional gestures. The two Swedish patent applications further provide ample teaching on how multiple objects may be tracked, both in two spatial dimensions and in three spatial dimensions.

The computing device 200 (and 100) is thus capable of tracking an object, such as a hand or a finger, and to identify gestures being performed by the tracked object. By assigning an action to each identified gesture a user need not touch the touch display and by implementing an object tracking and gesture identification means in a computing device the necessity for a touch display 120 is mitigated as the display will not be touched or used as much as other means for input are available and provides an improved manner of inputting commands. This further reduces the wear and tear of the expensive touch display 120.

The computing device 200 may further comprise a light sensor 270. The light sensor 270 may be paced adjacent or inside an opening for an ear piece or loud speaker (not shown) or a microphone (not shown). Such light sensor 270 can be used to detect whether the computing device is being held against a user's ear for example by detecting that the surrounding light is decreased. This enables the computing device 200 to save power as the display can be turned off during such times.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 3:
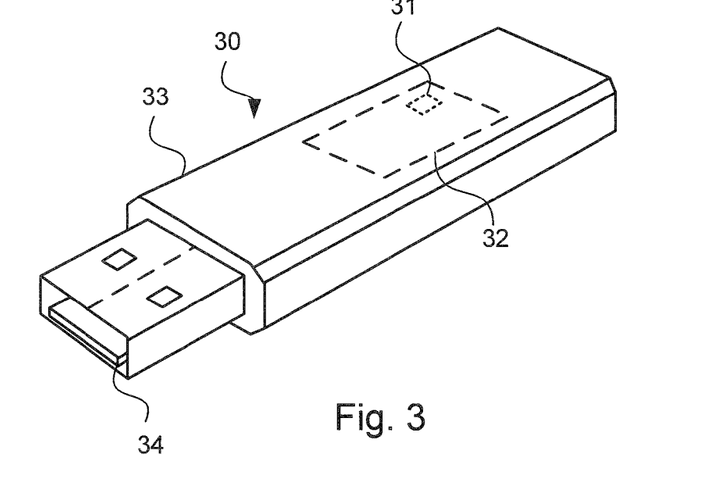
FIG. 3 is a schematic view of a computer-readable memory according to the teachings herein.

FIG. 3 shows a schematic view of a computer-readable medium as described in the above. The computer-readable medium 30 is in this embodiment a memory stick, such as a Universal Serial Bus (USB) stick. The USB stick 30 comprises a housing 33 having an interface, such as a connector 34, and a memory chip 32. The memory chip 32 is a flash memory, that is, a non-volatile data storage that can be electrically erased and re-programmed. The memory chip 32 is programmed with instructions 31 that when loaded (possibly via the interface 34) into a controller, such as a processor, executes a method or procedure according to the embodiments disclosed above. The USB stick is arranged to be connected to and read by a reading device, such as a terminal according to FIG. 1, for loading the instructions into the controller. It should be noted that a computer-readable medium can also be other mediums such as compact discs, digital video discs, hard drives or other memory technologies commonly used. The instructions can also be downloaded from the computer-readable medium via a wireless interface to be loaded into the controller.

Figure 4A:
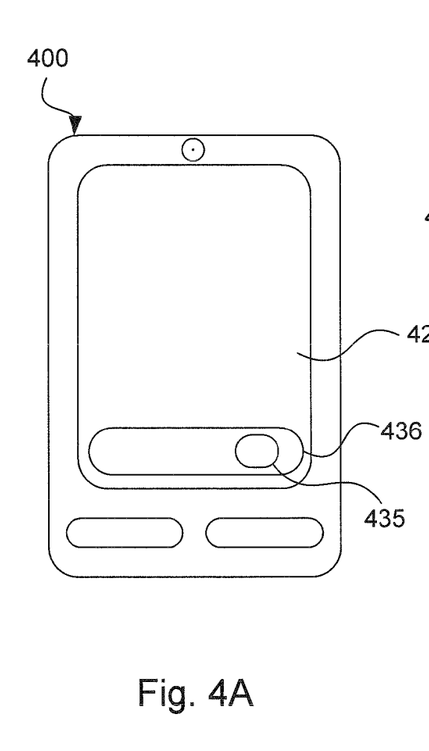
FIGS. 4A and 4B each shows an example of a prior art smartphone.

FIG. 4A shows an illustration of an example prior art computing device 400, in this example a prior art smartphone 400. The prior art smartphone 400 is arranged to display a virtual manipulation object 435 on a touch display 420. The virtual manipulation object 435 is to be manipulated within a manipulation area 436 to effect a command. As the virtual manipulation object 435 is manipulated by a user touching the touch display 420 for example by swiping the virtual manipulation object 435 from one end to an other end of the of the manipulation area 436, an associated command is executed. Commonly known examples of such manipulations and the associated commands are manipulate from left to right; unlock device and manipulate from right to left; mute/unmute device. The manipulation object 435 may be visually designed, for example by carrying an icon, to provide information on the associated command(s).

The virtual manipulation object 435, the manipulation area 436 and the nature of the manipulation have been carefully designed to require an accurate manipulation to provide input of the command thereby differentiating the manipulation of the virtual manipulation object 435 from unintentional manipulation of the touch display 420.

Figure 4B:
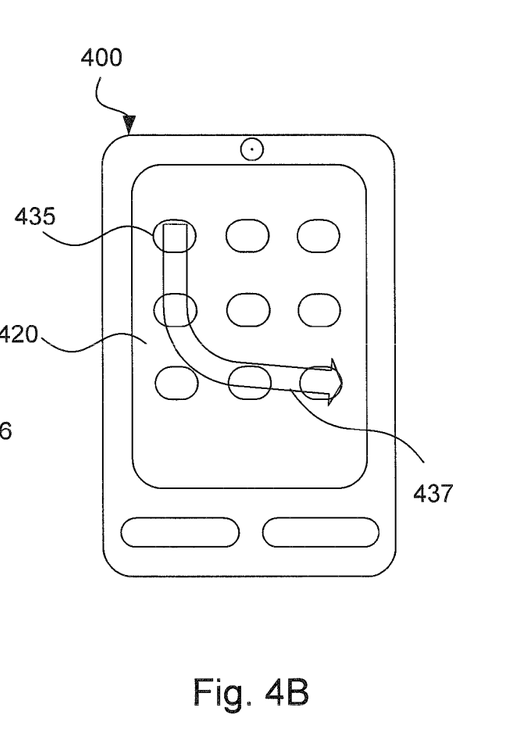

FIG. 4B shows an illustration of an example prior art computing device 400, in this example a prior art smartphone 400. The prior art smartphone 400 is arranged to display an array of virtual manipulation objects 435 on a touch display 420. The virtual manipulation objects 435 are to be manipulated by being touched in a sequence to effectuate an associated command of unlocking the smartphone 400. The sequence in which the virtual manipulation objects 435 are to be touched, replaces the use of a numeric PIN (Personal Identification Number) code. The virtual manipulation objects 435 are to be touched in a continuous swipe. One example of a sequence and the corresponding swipe is indicated in FIG. 4B as an arrow referenced 437.

The spatial arrangement of the virtual manipulation objects 435, the required sequence, the continuous swipe have been carefully designed to require an accurate manipulation of the virtual manipulation objects 435 thereby differentiating the manipulation of the virtual manipulation object 435 from unintentional manipulation of the touch display 420.

Since the virtual manipulation objects 435 will be touched in the same sequence repeatedly while using the smartphone 400 a fat/particle trace will soon build up and be visible on the touch display 420. A fraudulent user will therefore be able to (visually) discern the sequence that the virtual manipulation objects 435 are to be touched and will thus be able to gain unallowed access to the smartphone 400.

The sequence for touching the virtual manipulation objects 435 provides a further limitation to the security in that as the sequence is to be continuous, may only be affected on the nine virtual manipulation objects 435 the combinations for generating the sequence is limited. As a skilled person will realize, a limited available set of combinations provide for limited security. To increase the available set of combinations, the length of the sequence can be increased and allowing the sequence trace to cross itself. This increases the number of available combinations. However, increasing the length of the sequence, makes the sequence even more intricate to input and to remember thereby increasing the risk of unintentional faulty input and forgetting the sequence thereby possibly rendering the smartphone inoperable (at least temporarily) which is highly inconvenient to a rightful user. Such long sequences are also intricate and difficult to input correctly.

Figure 5A:
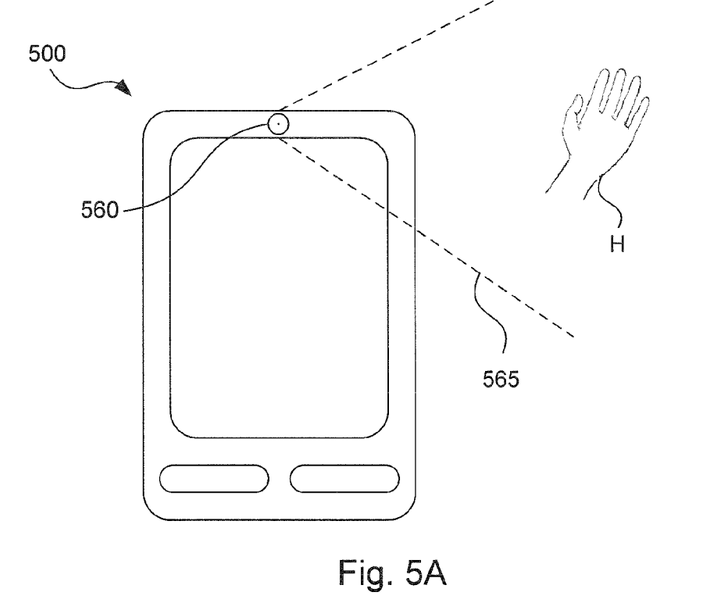
FIGS. 5A and 5B each shows an illustration of an improved computing device according to one embodiment of the teachings herein.

FIG. 5A shows an illustration of an improved computing device 500 according to one embodiment of the teachings herein. In this example the computation device 500 is a smartphone as in FIG. 1A (referenced 100) and FIG. 2 (referenced 200).

The smartphone is arranged with a camera 560 configured to provide an image stream of all objects, such as a hand H, appearing within a viewing cone 565, indicated with dashed lines in FIG. 5A (and FIG. 5B which will be disclosed below). A controller (not shown in FIG. 5, but referenced 210 in FIG. 2) is configured to track an object, such as the hand H, and identify a gesture made by the object, in this example the hand H. The details of how the tracking of the object and the identification of the gesture may be implemented are discussed with reference to FIG. 2 in the above.

Figure 5B:
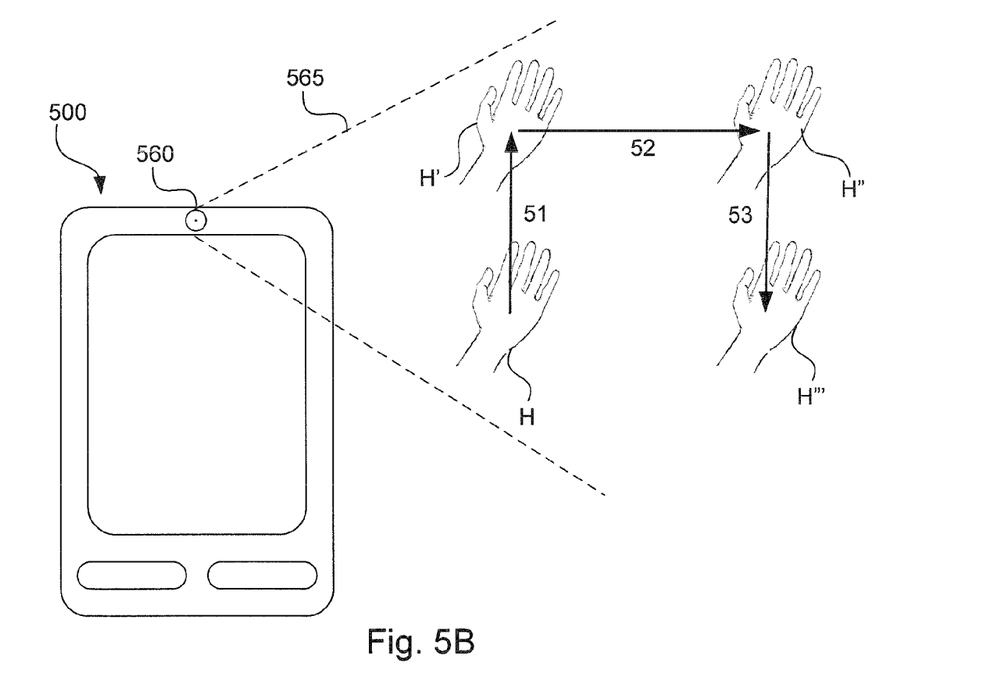

FIG. 5B shows an illustration of an improved computing device 500 according to one embodiment of the teachings herein, which is configured to track an object, in this example a hand H, and identify a gesture performed by the hand H. In this example the computation device 500 is a smartphone as in FIG. 1A (referenced 100) and FIG. 2 (referenced 200).

In the example of FIG. 5B the hand H performs a gesture by moving in three directions, referenced 51, 52 and 53 in FIG. 5B, from a first position of the hand H to a final position of the hand H'''.

The camera 560 and the controller (210) tracks the hand H through its sequence of movements 51, 52, 53 to the final position of the hand H''' and identifies the gesture and the associated command, which in this case is a command to unlock the computation device 500. The controller (210) is further configured to execute the associated command.

Examples of other associated commands are unlocking the computation device 500 with a coded gesture, locking the computation device 500 and unlocking the computation device 500 activating a coded lock.

A coded gesture (or code activating gesture) provides security in being of a different gesture that is more complicated than the gesture for simply unlocking the computation device 500.

As disclosed above the tracking and gesture identification may be performed for three dimensional gestures. This allows for a larger set of available combinations of for a sequence or gesture to represent a coded input, thereby providing the same level of security as the prior art computation devices but in a manner that is easier for a user to remember.

Furthermore, since the display is not touched no trace will be detectable on the display for fraudulent users to misuse or take advantage of.

Another advantage of using a camera to track gestures for locking/unlocking device is that as the display is not touched the wear and tear of the display is significantly reduced.

Furthermore, using a tracking and gesture identification as disclosed in the two Swedish patent applications referred to in the above, which can be used with a low resolution camera, a cost efficient alternative to a touch display is provided. A camera (esp. a low resolution camera) is cheaper and more robust than a touch display.

It is of importance to notice that a gesture to be tracked in free space does not require spatial precision as the manipulation of a virtual manipulation object requires. No exact start point or end point is required, nor are exact distances for each partial movement 51, 52, 53 required. It is thus much easier for a user to input a gesture than to manipulate a virtual manipulation object. Furthermore the gesture input is not dependent on making capacitive contact between the touch display and a hand H. This is particularly beneficial in climates where the use of gloves is common. Also, the input of gestures does not require a close proximity to the computation device and can also be effected at a distance.

It should be noted that as the manipulation of the virtual manipulation objects 535 require that the virtual manipulation objects 535 are actually touched the movement for the manipulation can not be considered to be a gesture. Contrary to the manipulations enabled by the prior art computation devices a gesture is, by its definition, not bound by starting positions or end positions or exact reciprocal partial movements and distances.

Performing a gesture, as opposed to manipulating a virtual manipulation object, does not require the same level of spatial precision and is much more simple to execute by, for example, a handicapped person.

To further simplify for a user to input a correct gesture, a visual indication of the gesture to be input or for providing feedback on the gesture performed so far can be displayed on the display.

Figure 6:
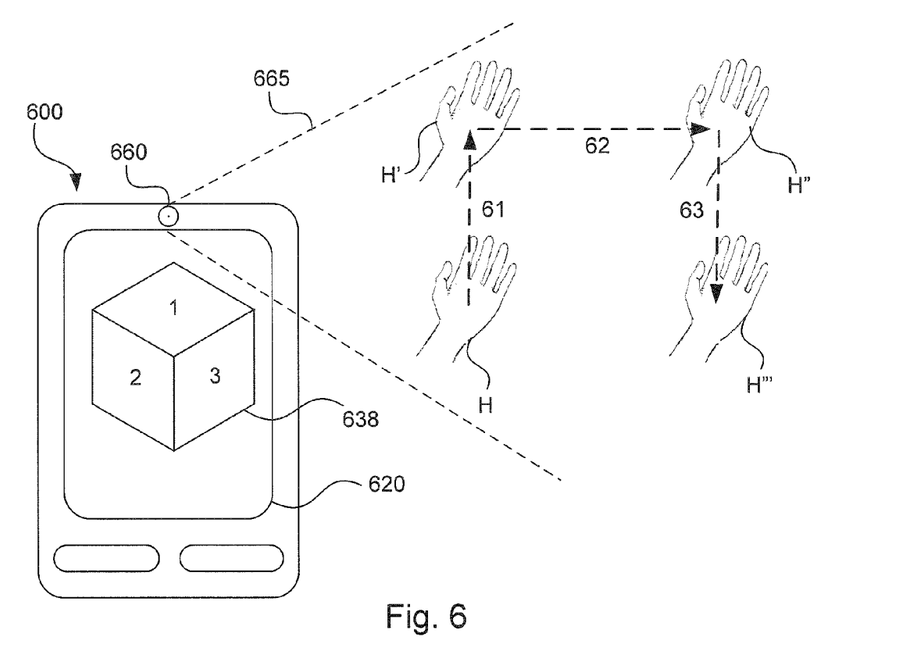
FIG. 6 shows an illustration of an improved computing device according to one embodiment of the teachings herein.

FIG. 6 shows an illustration of an improved computing device 600 according to one embodiment of the teachings herein. In this example the computation device 600 is a smartphone as in FIG. 1A (referenced 100) and FIG. 2 (referenced 200).

The computation device 600 is configured to display a visual indication in the form of a virtual object 638. In the example of FIG. 6A the visual indication 638 is a cube having six sides. By assigning different visual attributes, such as colors, numbering or images, to each side of the cube 638, an intuitive visual feedback of the tracked gesture is provided that is easy for a user to understand and thereby correlate his movements to the desired gesture to be made. Furthermore, it facilitates remembering the gesture to be made as the gesture will be associated with the visual indication 638.

The user will thus be able to perform his gesture, by a virtual manipulation of the visual indication 638.

It should be noted that the virtual manipulation of the visual indication 638 does not require the same spatial precision as the manipulation of a virtual manipulation object as disclosed with reference to FIG. 4A and FIG. 4B as it does not require any specific start or end position or any specific reciprocal distances. As long as a movement in one direction is detected, the visual indication will provide feedback on this.

Figure 7A:
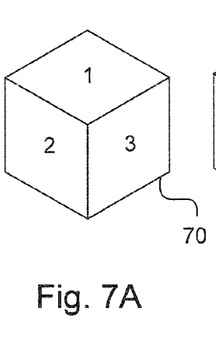
FIGS. 7A, 7B, 7C and 7D each shows a visual indication according to an embodiment of the teachings herein.
Figure 7B:
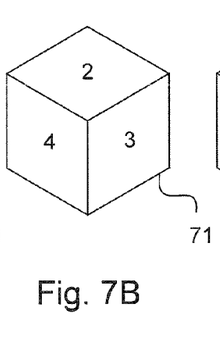
Figures 7C, 7D:
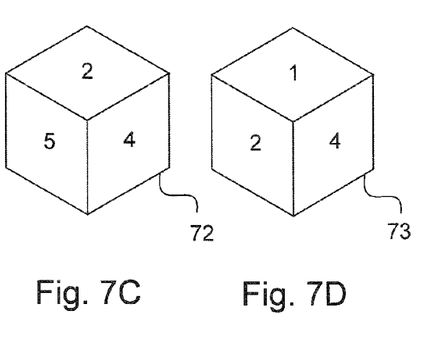

FIGS. 7A, 7B, 7C and 7D each show a visual indication 71, 72, 73, 74 corresponding to the movements 61, 62, 63 and the positions of the hand H, H', H", H'" in FIG. 6. It can be seen that the visual indication 71 of FIG. 7A is the starting position corresponding to the starting position of the hand H. The visual indication 72 of FIG. 7B is the intermediate position corresponding to the intermediate position of the hand H' after the movement 61. The visual indication 73 of FIG. 7C is the intermediate position corresponding to the intermediate position of the hand H" after the movement 62. And the visual indication 74 of FIG. 7D is the final position corresponding to the final position of the hand H' after movement 63. As can be seen, the visual indications 71 to 74 all show different sides of the visual indications (indicated by the side numbering).

It should be noted that the visual indication may be displayed in a random or varying alignment when the tracking is first activated, thereby enabling for having a random gesture to be associated with the unlock or lock command. The gesture is then identified by the end result of arranging the visual indication in a pre-specified alignment.

In other embodiment the visual indication 638 may be provided in the form of arrows following the tracked object, a line being drawn on the display illustrating the movement tracked.

Figure 8:
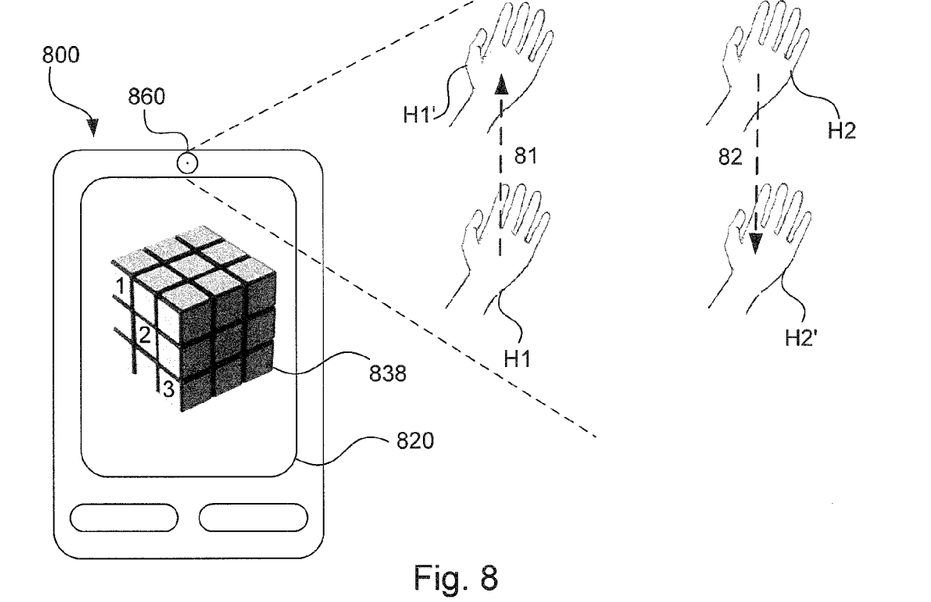
FIG. 8 shows an illustration of an improved computing device according to one embodiment of the teachings herein.

FIG. 8 shows an illustration of an improved computing device 800 according to one embodiment of the teachings herein. In this example the computation device 800 is a smartphone as in FIG. 1A (referenced 100) and FIG. 2 (referenced 200).

As has been disclosed in the two Swedish patent applications referred to in the above, multiple objects may be tracked for identifying multiple-object gestures. In the example of FIG. 8, two objects, in this example two hands H1 and H2, are tracked by a camera 860 in cooperation with a controller (not shown but referenced 210 in FIG. 2). The left hand is tracked from an initial position H1 along a movement 81 to a final position H1'. The right hand is tracked from an initial position H2 along a movement 82 to a final position H2'.

By tracking multiple objects, such as two hands, two fingers or any combination thereof, the complexity of the gestures to be tracked increases, still without requiring the same spatial precision as in prior art systems.

In one example embodiment, the computation device 800 is configured to display a visual indication 838 in the form of a visual puzzle, which in this example is a complicated multipart cube 838. The multipart cube 838 in this example comprises 27 different parts, each part having two or three sides. As for the visual indication of FIGS. 6 and 7A to 7D each side may be identified through the use of different coloring, labels, such as numbers or other symbols, or different images, just as for the visual indication of FIGS. 6 and 7A to D. In the example of FIG. 8 three sides are indicated to be numbered, 1 to 3. One popular and well-known example of a multipart cube is the Rubik's Cube®.

In the example of assigning a number to each side of a cube, a PIN code can be input by arranging the sides in a particular (pre-specified) order.

Enabling a user to solve a visual puzzle provides an intuitive manner of guiding the user in how to remember the exact order of movements in a complicated gesture, all while not requiring the spatial precision required by prior art solutions.

As is disclosed under reference to FIG. 7, it should be noted that the visual indication may be displayed in a random or varying alignment when the tracking is first activated, thereby enabling for having a random gesture to be associated with the unlock or lock command. The gesture is then identified by the end result of arranging the visual indication in a pre-specified alignment. This provides a particularly difficult manner of retracing the steps by a fraudulent user as simply repeating a gesture will not provide the same end result.

To save power, the camera of a computation device should be turned off when not needed. However, as the computation device will not be able to track any objects when the camera is turned off, it is beneficial to implement a startup trigger for the camera that starts the camera when the need for object tracking is imminent.

In one embodiment such a startup trigger is implemented through a special key (referred as 130 in FIG. 1) or assigning a startup action to a key in a particular mode or scenario. For example, by pressing an on/off key the computation device can be started and if the computation device is in a locked state, the camera is activated for tracking an object for identifying an unlock gesture.

The authors of this application have realized that since most contemporary portable computation devices are able to determine their orientation and/or if they are being tilted. For example, they are capable of determining if they are being held in a landscape or portrait position and rearrange the display accordingly.

Figure 9:
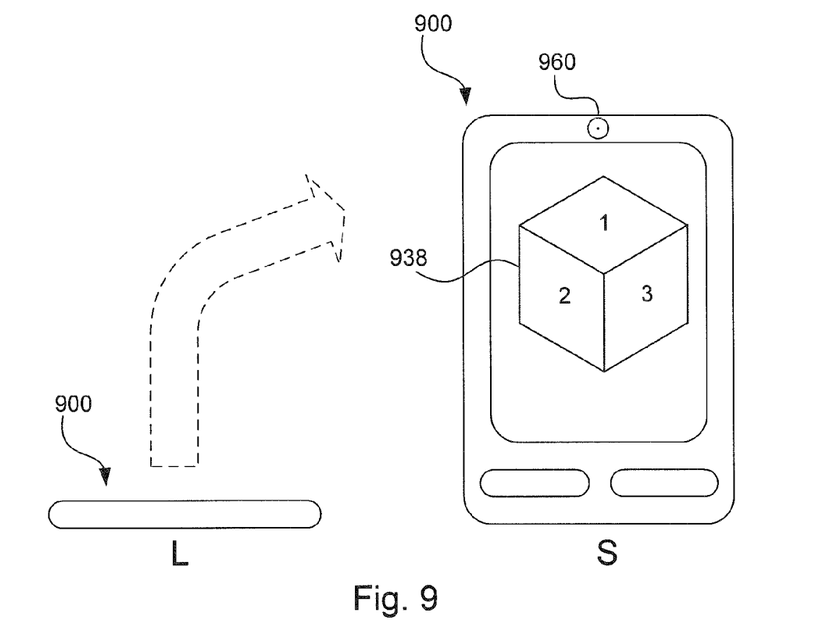
FIG. 9 shows an illustration of how a computation device is raised from a lying position to an upright position according to an example embodiment of the teachings herein.

FIG. 9 shows an illustration of how a computation device 900, such as the computation device 100 of FIG. 1 or the computation device 200 of FIG. 2 is tilted or raised from a lying position (indicated by an L in FIG. 9) to an upright position (indicated by an S as in standing in FIG. 9). This basically represents a user picking up the phone to use it.

The controller (not shown in FIG. 9, but referenced 210 in FIG. 2) is configured to detect that the computation device 900 is tilted or moved to an upright position and in response thereto activate a camera 960 to initiate tracking of objects, such as a hand, to identify gestures.

To prevent that the camera consumes too much power if the camera 960 is accidentally activated through an involuntary tilting movement, the controller is configured to determine whether an object to be tracked has been identified within a threshold time T1. If no such object has been identified, the camera is switched off again to preserve power. The threshold time may be 5 seconds, 10 seconds or 5 to 10 seconds.

By further realizing that any accidental tilting while wearing the computation device in a pocket or carrying the computation device in a purse (or tightly in a hand) will not allow tracking of any object as there is no light, any accidental activation of the tracking can not result in any unintentionally identified gestures. To preserve (battery) power the controller is configured to determine whether there is any light when or before the camera 960 is activated, and if there is no light, or the light is to dim, the camera 960 is deactivated or not activated.

In one embodiment the computing device is 900 configured to detect the surrounding light level using the camera 960. This requires that the camera is turned on to be able to detect the surrounding light, but it does not require the use of other hardware.

In one embodiment the computing device is 900 configured to detect the surrounding light level using a light sensor (not shown in FIG. 9, but referenced 270 in FIG. 2). This does not require the camera 960 to be turned on to detect the surrounding light as the light sensor is able to detect the surrounding light as the tilting movement is detected. The light sensor consumes much less power than a camera and has a shorter startup time than the camera. By utilizing the already installed light sensor in many computing devices 900, such as in smart phones, no additional hardware is required.

In one embodiment the controller is configured to determine whether there is enough light or not within a time span. The time span is for example 1 second or 5 second or in the range of 1 to 5 seconds. This allows for a user to pick up his computation device 900, and have the camera 960 be activated when it is in a position where it is ready to be used even if the user accidentally covered the camera 960 while picking up the computation device 900.

This also solves a known problem of accidental activation when being carried in a purse or pocket, common to prior art computation devices. As there is no light when the computation device 900 is carried in a pocket or purse, no gestures will be identified and the computation device 900 can thus not be activated accidentally.

In one embodiment the controller is configured to sense that there is enough light to track an object and activate the camera in such cases even without a specific movement. In such an embodiment the triggering action may be detecting a change in the light environment from (darkness to light) by the light sensor. The determination that there is an object to be tracked as described above, may of course also be performed to prevent any longer unnecessary activations of the camera.

This allows the gesture tracking to be started by simply uncovering the computation device.

Figure 10:
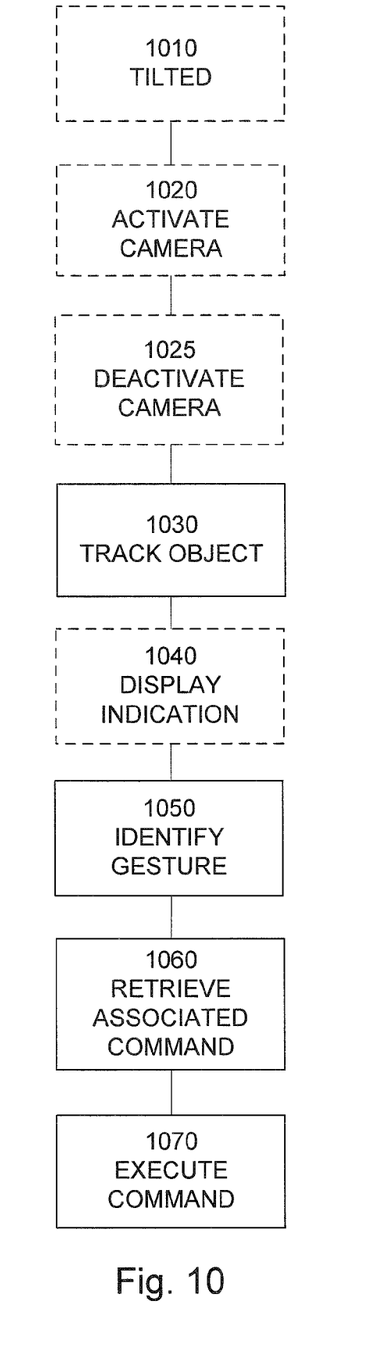
FIG. 10 shows a flowchart for a general method to be implemented by a controller of a computation device according to an embodiment of the teachings herein.

FIG. 10 shows a flowchart for a general method to be implemented y a controller of a computation device according to the teachings herein. A computation device, such as in FIGS. 1, 2, 4, 5, 6, 8 and 9, being in a locked state, is arranged to track 1030 an object making movements to identify 1050 a gesture. The gesture is associated with a command and a controller retrieves 1060 the associated command and executes it 1070. In one embodiment the associated command is an unlock command.

The controller may further be arranged to display 1040 a visual indication according to the tracked movements of the tracked object.

The controller may further be arranged to determine that the computation device is being tilted 1010 and in response thereto activate 1020 a camera. The controller may be further configured to determine if the camera should be activated 1025 (or remain activate) based on a determination that no object is present to be tracked and/or that the amount of light is not enough to track an object and in response thereto refrain from activating the camera or deactivating the camera if the camera is already active.

Optionally, the determination of the tilting and the subsequent determination of available light and objects to be tracked can be replaced by detecting that an assigned key is pressed.

As is indicated in FIG. 10 with dashed lines, some actions of the method are optional. Furthermore, some actions may be performed in a different order than explicitly disclosed herein.

Even though the method according to above have been disclosed with reference to an unlocking command, it should be noted that the method can be modified to enable the situation where the computation device is in an unlocked state and identifies a gesture for locking the computation device.

Although the visual indicators have been described as being cubes, which have been described as having six (main) sides, it should be noted that also other cubes may be used as a visual indicator. Examples of such cubes are: dodecahedrons, icosahedrons, octahedrons and tetrahedrons to name a few. Also, other visual indicators may also be used, such as arrows, lines, balls and triangles to name a few.

It should also be noted that even though the description herein is given referring to the use of hands as objects to be tracked, the teachings herein may be equally well applied to tracking fingers and eye movements.

The teachings herein provide the benefit that the simple calculations do not require any vast computational resources to be implemented efficiently. For example, the manner taught does not require any scaling, rotation or deformation operations to be made and the determination of the curvatures is indeed simple and elegant. The manner taught herein is thus suited for use in low or adverse light conditions which also makes it highly suited for portable devices and entertainment systems.

The manner of identifying gestures disclosed herein is beneficial in that as it is based on directions instead of absolute positions it is less sensitive to the distance between the object and camera. There is also no need for scaling a tracked object to fit a library or reference object. This is particularly useful as the same gesture setting may be employed for different devices (such as but not limited to TV, mobile phones and stationary computers).

Furthermore, the gesture library only requires a minimum of data so it is easy to store and fast to manipulate thereby requiring only a minimum of computational resources.

The manner disclosed herein is also able to handle changes in scale in that it interprets a change in scale as a gesture in a direction parallel with a line of sight or it ignores such movements. This provides for a robust manner of identifying gestures.

The teachings herein provide the benefit that the simple operations of comparing an angle and possibly a distance do not require any vast computational resources to be implemented efficiently. For example, the manner taught does not require any scaling, rotation or deformation operations to be made and the determination of the curvatures is indeed simple and elegant. The manner taught herein is thus suited for use in low or adverse light conditions which also makes it highly suited for portable devices and entertainment systems.

Another benefit lies in that no training of the tracking system or the gesture identification is required.

Yet another benefit lies in that the manner taught herein is very easy to integrate in an existing device as the input required is the image stream which can be provided as a video stream from a camera (internal or external) or through another video source, such as a film or streamed video stream. The output provided is the coordinates for the relative movement which, in combination with the input, creates a simple interface to the manner taught herein that is easy to integrate into existing devices as well as into designs for devices to be produced.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A computing device arranged for tracking an object in an image stream provided by a camera, said computing device comprising a memory and a controller, wherein said controller is configured to:

detect a startup trigger by detecting that said computation device is moved to an upright position;

detect the surrounding light level and determine whether there is enough light to track an object and if so activate the camera;

track at least one object;

identify a gesture, wherein said gesture is defined by said tracked at least one object moving in free space in front of said camera;

retrieve an associated command;

execute said associated command, wherein said associated command is a command for controlling access to the computation device; and determine whether there are any objects to be tracked discernible in front of said camera, and if not, deactivate said camera.

2. The computing device of claim 1, further comprising a light sensor and wherein said controller is further configured to detect the surrounding light level by receiving light data from said light sensor.

3. The computing device of claim 1, wherein said controller is further configured to display a visual indication according to movements tracked for said at least one object to be tracked.

4. The computing device of claim 3, wherein said visual indication has identifiable sides and which sides are to be arranged in a specific manner to complete said gesture.

5. The computing device of claim 3, wherein said controller is further configured to display said visual indication in a varying alignment when the tracking is activated.

6. The computing device of claim 3, wherein said controller is further configured to display said visual indication as a cube.

7. The computing device of claim 6, wherein said visual indication is a multipart body.

8. The computing device of claim 1, wherein said controller is configured to track two or more objects and identify a gesture based on at least one movement performed by each tracked object.

9. The computing device of claim 1, wherein said gesture represents an unlocking gesture and said command is an unlocking command allowing access to the computation device.

10. A computing device according to claim 1, wherein said computing device is a mobile communications terminal.

11. A computing device according to claim 1, wherein said computing device is an internet tablet or a laptop computer.

12. A computing device according to claim 1, wherein said computing device is a game console.

13. A method for use in a computing device arranged for tracking an object in an image stream provided by a camera, said method comprising:

detecting a startup trigger by detecting that said computing device is moved to an upright position;

detecting the surrounding light level and determine whether there is enough light to track an object and if so activate the camera;

tracking at least one object;

identifying a gesture, wherein said gesture is defined by said tracked at least one object moving in free space in front of said camera;

retrieving an associated command;

executing said associated command, wherein said associated command is a command for controlling access to the computation device, and determining whether there are any objects to be tracked discernible in front of said camera, and if not, deactivate said camera.

14. A non-transitory computer readable storage medium encoded with instructions that, when loaded and executed on a processor, causes the processor to perform the steps of:

detecting a startup trigger by detecting that said computing device is moved to an upright position;

detecting the surrounding light level and to determine whether there is enough light to track an object and if so activate the camera;

tracking at least one object;

identifying a gesture, wherein said gesture is defined by said tracked at least one object moving in free space in front of said camera;

retrieving an associated command;

executing said associated command, wherein said associated command is a command for controlling access to the computation device, and determining whether there are any objects to be tracked discernible in front of said camera, and if not, deactivate said camera.

* * * * *